US012493335B2

(12) United States Patent
Goh et al.

(10) Patent No.: US 12,493,335 B2
(45) Date of Patent: Dec. 9, 2025

(54) SYSTEM AND METHOD FOR A POWER SUSTAINABILITY MOUSE WITH INERTIAL SOLENOIDAL ENERGY HARVESTER DEVICE

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 90 days.

(21) Appl. No.: 18/377,018

(22) Filed: Oct. 5, 2023

(65) Prior Publication Data
US 2025/0117057 A1     Apr. 10, 2025

(51) Int. Cl.
*G06F 1/26*     (2006.01)
*G06F 1/3215*   (2019.01)
(Continued)

(52) U.S. Cl.
CPC ............ *G06F 1/263* (2013.01); *G06F 1/3215* (2013.01); *G06F 1/3231* (2013.01);
(Continued)

(58) Field of Classification Search
CPC .......... G06F 1/263; G06F 1/30; G06F 1/3212; G06F 1/3215; G06F 1/3231;
(Continued)

(56) References Cited

U.S. PATENT DOCUMENTS 5,975,714 A * 11/1999 Vetorino ................ H02K 35/02
                                                                 362/205
6,169,343 B1 * 1/2001 Rich, Sr. .............. H02K 35/02
                                                                 310/15
(Continued)

FOREIGN PATENT DOCUMENTS

| EP | 3257591 B1 | 12/2019 |
| WO | 2015/015523 A1 | 2/2015 |
| WO | 2021/236334 A1 | 11/2021 |

*Primary Examiner* — Thomas J. Cleary
(74) *Attorney, Agent, or Firm* — Prol Intellectual Property Law, PLLC; H. Kenneth Prol

(57) ABSTRACT

A wireless mouse operatively coupled to an information handling system including a wireless mouse microcontroller and a power management unit (PMU) to provide power to the wireless mouse microcontroller and the PMU operatively coupled to a battery and an ultracapacitor. The wireless mouse further comprising a inertial solenoidal energy harvester device operatively coupled to the PMU and placed within a housing of the wireless mouse to charge the ultracapacitor when the wireless mouse is moved. The wireless mouse microcontroller executing code instructions to determine a standby mode or an active mode based on input from an actuation/engagement sensor with regard to user engagement and, with the wireless mouse PMU, switch between a power source from the battery to the ultracapacitor when the wireless mouse is in a standby mode and to switch back when the wireless mouse is in active use.

20 Claims, 7 Drawing Sheets

(51) Int. Cl.
*G06F 1/3231* (2019.01)
*G06F 3/0354* (2013.01)
*G06F 3/044* (2006.01)
*H02J 7/34* (2006.01)
*H02J 50/00* (2016.01)
*H02K 35/02* (2006.01)

(52) U.S. Cl.
CPC .......... *G06F 3/03543* (2013.01); *G06F 3/044* (2013.01); *H02J 7/345* (2013.01); *H02J 50/001* (2020.01); *H02K 35/02* (2013.01)

(58) Field of Classification Search
CPC ..... G06F 3/03543; G06F 3/044; H02K 35/02; H02J 50/001; H02J 7/345
See application file for complete search history.

(56) References Cited

U.S. PATENT DOCUMENTS

| | | | |
|---|---|---|---|
| 9,170,621 B2* | 10/2015 | Chen | G06F 1/263 |
| 10,211,679 B1* | 2/2019 | Li | H02J 50/001 |
| 11,368,044 B2 | 6/2022 | Wale | |
| 11,621,578 B2 | 4/2023 | Wale | |
| 12,373,015 B2* | 7/2025 | Goh | G06F 3/03543 |
| 2001/0010513 A1 | 8/2001 | Rosenberg | |
| 2002/0172060 A1* | 11/2002 | Takeuchi | H02K 35/00 363/110 |
| 2003/0095101 A1* | 5/2003 | Jou | G06F 3/03543 345/163 |
| 2004/0008510 A1* | 1/2004 | Mah | H02K 35/02 362/205 |
| 2006/0267944 A1 | 11/2006 | Rosenberg | |
| 2009/0200983 A1* | 8/2009 | Dyer | H02K 35/02 320/107 |
| 2011/0156501 A1* | 6/2011 | Peng | H02K 35/02 310/28 |
| 2012/0068669 A1* | 3/2012 | Trainor | H01M 16/003 320/167 |
| 2015/0091528 A1* | 4/2015 | Yang | H10N 30/306 320/114 |
| 2017/0170675 A1* | 6/2017 | Ni Scanaill | H02J 7/345 |
| 2017/0205879 A1* | 7/2017 | Joseph | G06F 3/03544 |
| 2019/0074712 A1* | 3/2019 | Liang | H02J 7/00714 |
| 2021/0157420 A1* | 5/2021 | Krishnakumar | G06F 3/0304 |
| 2021/0367445 A1 | 11/2021 | Wale | |
| 2021/0408821 A1* | 12/2021 | Rodrigues Mansano | H02J 9/04 |
| 2022/0093303 A1 | 3/2022 | Vlasov | |
| 2022/0320891 A1 | 10/2022 | Wale | |
| 2022/0407401 A1* | 12/2022 | Parida | H02K 35/02 |
| 2023/0188059 A1* | 6/2023 | Song | H02N 2/186 310/339 |
| 2024/0045512 A1* | 2/2024 | Kos | G06F 3/03543 |

\* cited by examiner

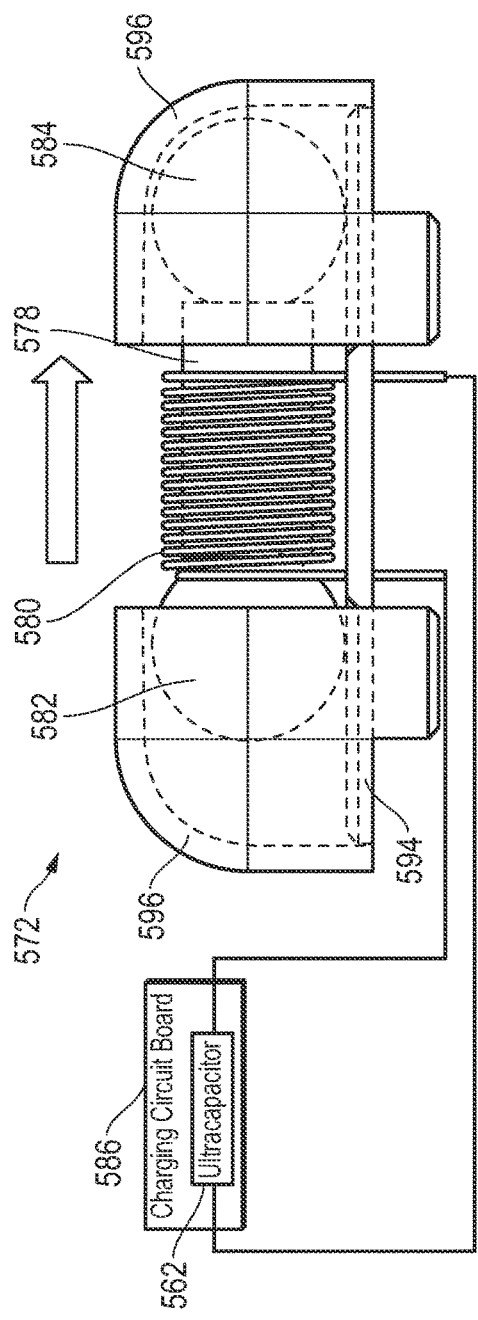
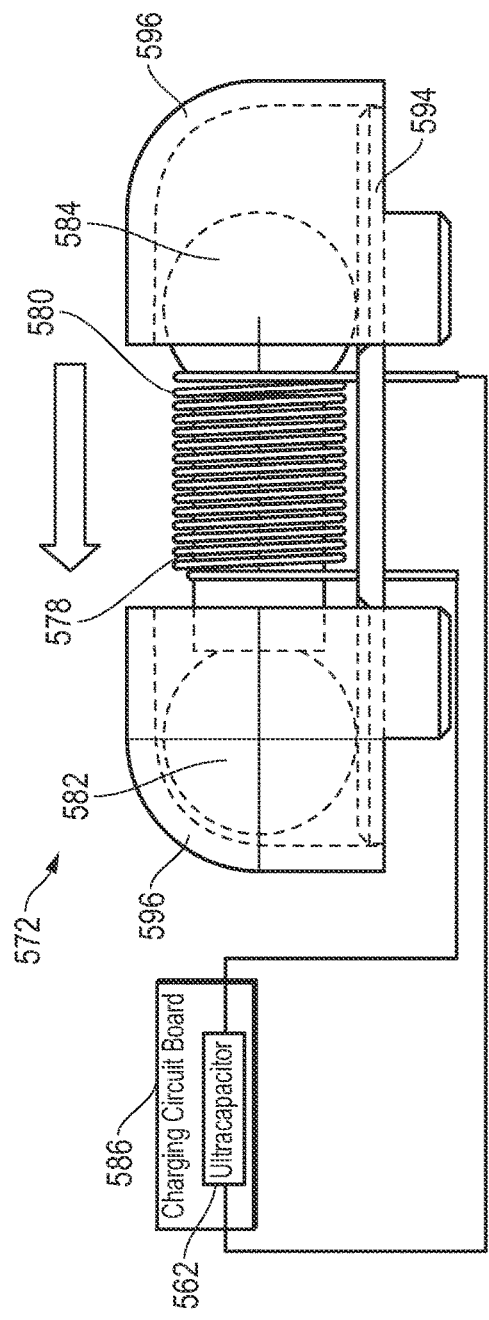

SYSTEM AND METHOD FOR A POWER SUSTAINABILITY MOUSE WITH INERTIAL SOLENOIDAL ENERGY HARVESTER DEVICE

FIELD OF THE DISCLOSURE

The present disclosure generally relates to a wireless mouse. The present disclosure more specifically relates to a wireless mouse that includes an ultracapacitor that is charged via an inertial solenoidal energy harvester device while the wireless mouse is being used and is not in a standby mode.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include any number of wireless peripheral devices including a wireless mouse used to provide input to and receive output from the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5A is a side view of a inertial solenoidal energy harvester for use within a housing of a wireless mouse and operatively coupled to an ultracapacitor on a charging circuit board according to an embodiment of the present disclosure;

FIG. 5B is a side view of a inertial solenoidal energy harvester for use within a housing of a wireless mouse and operatively coupled to an ultracapacitor on a charging circuit board according to another embodiment of the present disclosure.

The use of the same reference symbols in different drawings may indicate similar or identical items.

DETAILED DESCRIPTION OF THE DRAWINGS

Figure 1:
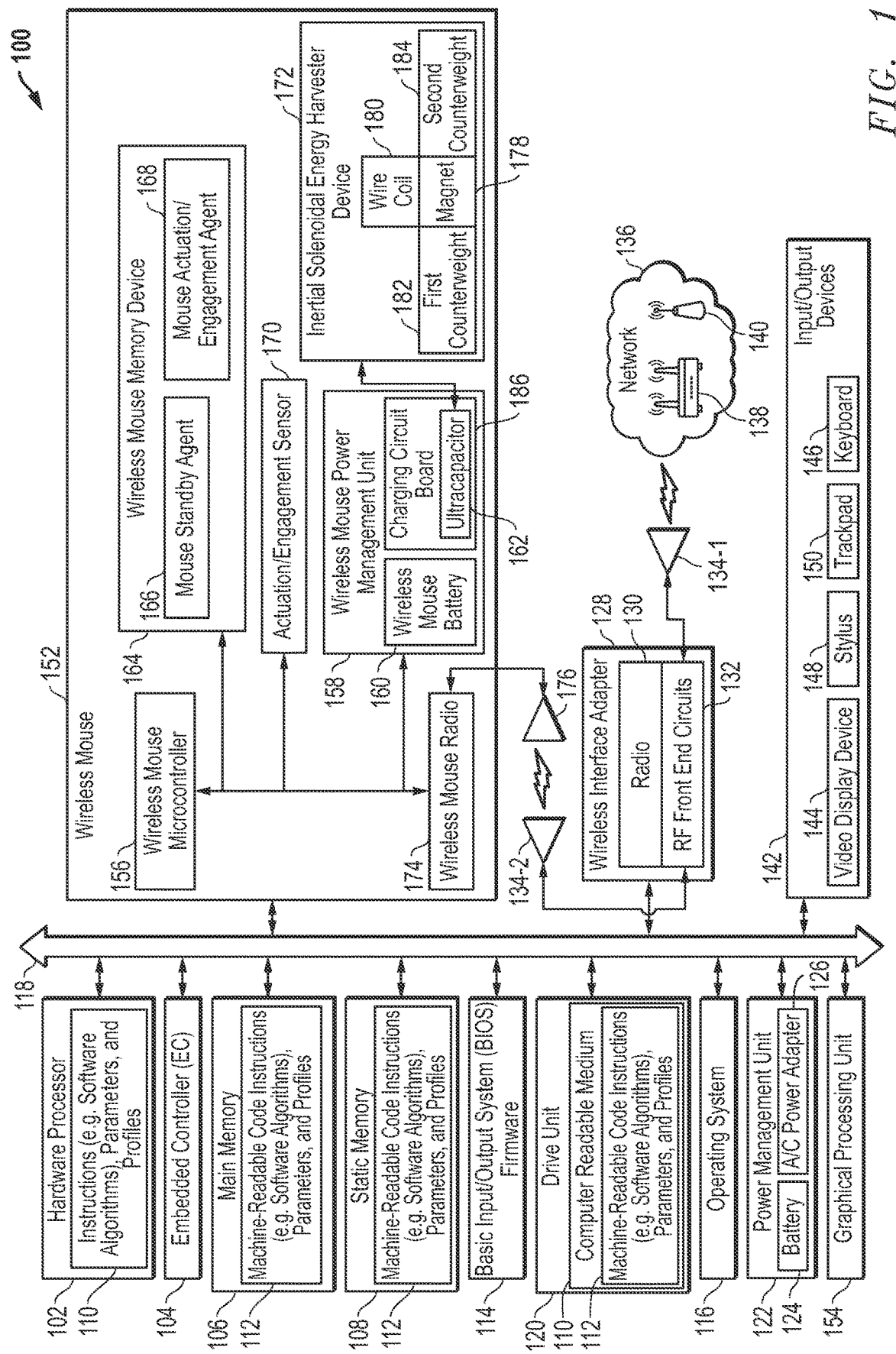
FIG. 1 is a block diagram illustrating an information handling system with a wireless mouse having an inertial solenoidal energy harvester device according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems include input/output (I/O) devices that allow a user to interface with the information handling system. Some of these I/O devices may be wireless I/O devices that transceive data to and from the information handling system. Specifically, a wireless mouse may communicate cursor movement and button actuation data to the information handling system as the user actuates one or more buttons of the wireless mouse as well as move the wireless mouse across a surface. However, because the wireless mouse is continuously communicating with the information handling system regardless of whether input at the wireless mouse is received from a user, the wireless mouse will consume power even where a standby mode is activated. The power source is often a battery such as a dry cell battery or a rechargeable battery. However, with the wireless mouse constantly being powered on even in a standby mode, the battery is drained of power. This causes the user to have to constantly replace or recharge the battery when depleted relatively often. This leads to significant costs associated with battery replacement. Additionally, because the battery has to be replaced, the disposal of the batteries may increase damage to the environment even if they are disposed of properly by the user.

The present specification describes a wireless mouse operatively coupled to an information handling system that includes a wireless mouse microcontroller and a wireless mouse power management unit (PMU) to provide power to the wireless mouse microcontroller and the wireless mouse PMU operatively coupled to a battery and an ultracapacitor. The wireless mouse further includes a inertial solenoidal energy harvester device operatively coupled to the wireless mouse PMU and placed within a housing of the wireless mouse to charge the ultracapacitor when the wireless mouse is moved. The inertial solenoidal energy harvester device may include a wire coil with a magnet placed within the wire coil, a first counterweight placed at a first end of the magnet, and a second counterweight placed at a second end of the magnet. A mouse actuation/engagement agent is included to, when executed by the wireless mouse microcontroller, determine when input has been received at the wireless mouse such as when the wireless mouse has been moved based on input from an actuation/engagement sensor and, with the wireless mouse PMU, transition to or maintain a power source at a battery and to charge the ultracapacitor when the wireless mouse is active and is not placed in a standby mode.

In an embodiment, a mouse standby agent may be included to, when executed by the wireless mouse microcontroller, determine when a threshold time period has expired since a user has last interacted with the mouse based on the wireless mouse engagement data received by the mouse actuation/engagement sensor. When the threshold time period has expired, the wireless mouse microcontroller places the wireless mouse in a standby mode and, with the wireless mouse PMU, transitions power for the wireless mouse to the ultracapacitor instead of the battery. This allows the wireless mouse to dynamically switch from operating under the power of a battery to the power provided by the ultracapacitor depending on an active mode or standby mode such that movement of the wireless mouse by a user generates charge that is used to later power the wireless mouse when in standby mode. This reduces the power drained at the battery thereby reducing the necessity to replace the battery. This further reduces the environmental impact of the use of the wireless mouse due to the frequency of battery disposal being reduced.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, hardware processor 102, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as the keyboard 146 described herein, a touchpad 150, a wireless mouse 152, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wireless communication with the I/O devices 142 such as the wireless mouse 152 described herein, a wireless keyboard 146, video display device 144, stylus 148, or touchpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 including the wireless mouse 152 described herein that allows the user to interface with the information handling system 100 via the video/graphics display device 144, such as a cursor control device (e.g., a touchpad 150, or gesture or touch screen input), a stylus 148, and/or a keyboard 146, among others. Various drivers and control electronics may be operatively coupled to operate the I/O devices 142 according to the embodiments described herein. The present specification contemplates that the I/O devices 142 may be wired or wireless. In the context of the wireless mouse 152 described herein, the wireless mouse 152 is operatively coupled to the information handling system 100 via a wireless connection using a wireless mouse radio 174 and wireless mouse antenna 176.

A network interface device of the information handling system 100 shown as wireless interface adapter 128 can provide connectivity among devices such as with Bluetooth® (e.g., 2.4 GHz) or to a network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134-1, 134-2 and other circuitry of the radio 130 such as one or more antenna ports used for wireless communications via multiple radio access technologies (RATs). The radio 130 may communicate with one or more wireless technology protocols. In embodiments described herein, the wireless interface device 128 with its radio 130, RF front end 132 and antenna 134-2 is used to communicate with the wireless mouse 152 via, for example, a Bluetooth® or Bluetooth® Low Energy (BLE) radio protocols at, for example, 2.4 GHz or 6 GHz frequencies.

In an embodiment, the wireless interface adapter 128 may operate in accordance with any wireless data communication standards. To communicate between the information handling system 100 and any wireless I/O device, including the wireless mouse 152, the wireless interface adapter may use wireless data communication standards for a WPAN connection or a wireless protocols such as the Bluetooth® or BLE standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, a video/graphic display device 144, or other wired I/O devices 142 such as the stylus 148, a keyboard 146, and a touchpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system is operatively coupled to a wireless mouse 152. The wireless mouse 152 may be used by a user to provide input to the information handling system 100 in the form of selection data via actuation of a button on the mouse and/or cursor movement via movement of the wireless mouse 152 by the user. As described herein, the wireless mouse 152 includes a wireless mouse radio 174 and wireless mouse antenna 176 that is used to communicate with the information handling system 100 that, in embodiments herein, executes a wireless mouse driver that allows the communication between the information handling system 100 and the wireless mouse 152.

The wireless mouse 152 further includes a wireless mouse microcontroller 156. The wireless mouse microcontroller 156 may be any type of processing device that is capable of executing the machine-readable code instructions (e.g., firmware or software algorithms), parameters, and profiles such as the mouse standby agent 166 and mouse actuation/engagement agent 168 described herein. The wireless mouse microcontroller 156 may also receive input from, for example, an actuation/engagement sensor 170 used to determine whether a power supply should be switched from an ultracapacitor 162 to a wireless mouse battery 160 or from a wireless mouse battery 160 to the ultracapacitor 162 according to embodiments of the present disclosure.

The wireless mouse 152 further includes a wireless mouse memory device 164. The wireless mouse memory device 164 may be used to store computer readable code of the mouse standby agent 166 and/or mouse actuation/engagement agent 168 as well as any data used by the wireless mouse microcontroller 156 to execute the systems and methods described herein.

The wireless mouse 152 also includes a wireless mouse PMU 158. The wireless mouse PMU 158 may include a hardware controller to execute machine-readable code instructions or operate other switch hardware to manage or control the power provided to the components of the wireless mouse 152 such as the wireless mouse microcontroller 156, the actuation/engagement sensor 170, the wireless mouse memory device 164, and other wireless mouse hardware components described herein. In an embodiment, the wireless mouse PMU 158 may monitor power levels and be electrically coupled to the wireless mouse battery 162 or ultracapacitor 162 to provide this power. The wireless mouse PMU 158 may be used, via operation of the wireless mouse microcontroller 156, to dynamically regulate power from power sources within the wireless mouse 152 such as the wireless mouse battery 160 and the ultracapacitor 162 depending on an active mode or standby mode according to embodiments described herein.

The wireless mouse 152 further includes a inertial solenoidal energy harvester device 172 operatively coupled to the ultracapacitor 162 such that actuation of the inertial solenoidal energy harvester device 172 creates an electrical charge used to charge the ultracapacitor 162 via a charging circuit 186. The wireless mouse microcontroller 156 and wireless mouse PMU 158 may coordinate the charging of the ultracapacitor 162 with the inertial solenoidal energy harvester device 172 as described herein when the user is actively engaging with the wireless mouse 152 in an active mode. In an embodiment, the wireless mouse microcontroller 156 may execute the mouse standby agent 166 to determine when no interaction has happened for a period of time or, with the actuation/engagement sensor 170, when a user is present or the user interacts with the wireless mouse 152. Where execution of the mouse standby agent 166 determines that user interaction, engagement, and/or presence is not detected within a threshold time period, the wireless mouse microcontroller 156 may place the wireless mouse in a standby mode. For example, the wireless mouse microcontroller 156 determines whether the wireless mouse 152 is to be placed in a standby mode when no user presence is detected, when no actuation of a button on the wireless mouse 152, or when the wireless mouse 152 has not been detected to have been moved by the user within the threshold time period. When placed in a standby mode, the wireless mouse 152 switch the power source to the ultracapacitor 162 instead of the wireless mouse battery 160 via the wireless mouse PMU 158, thereby conserving the power within the wireless mouse battery 160 during non-use of the wireless mouse 152 in standby mode.

In an embodiment, the actuation/engagement sensor 170 may be any sensor that detects the user's presence in front of the wireless mouse 152 or that detects the user interacting with the wireless mouse 152. By way of example, the actuation/engagement sensor 170 may be a movement sensor such as a LED movement tracking sensor to detect a user moving the wireless mouse 152. In another example, the actuation/engagement sensor 170 may be a triggering device such as a button switch that detects a user actuating any button or a specific button on the wireless mouse 152. For example, the actuation/engagement sensor 170 may include a button of the wireless mouse 152 that, when providing input to the wireless mouse microcontroller 156, indicates that the button on the wireless mouse 152 has been pressed or actuated by a user. In another embodiment, the actuation/engagement sensor 170 may be a sensor that detects a user's interaction with the housing of the wireless mouse 152 such as a motion detector that detects motion near the wireless mouse 152 or a capacitive or other touch sensor to detect a touch of the wireless mouse 152. In yet another embodiment, the actuation/engagement sensor 170 may be a proximity sensor that emits an electromagnetic, infrared, or visible light field or beam of to detect a change in the field of the beam or a return signal bouncing off of an object such as the user.

When the actuation/engagement sensor 170 is triggered, data indicating this is transmitted to the wireless mouse microcontroller 156. With this data the wireless mouse microcontroller 156 may cause the wireless mouse 152 to exit the standby mode. As a result of exiting the standby mode, the wireless mouse microcontroller 156, with the wireless mouse PMU 158, may cause the wireless mouse 152 to switch power source to the wireless mouse battery 160 instead of the ultracapacitor 162. As described herein, this prevents the wireless mouse 152 from being powered constantly by a wireless mouse battery 160 during standby mode but allow switching to battery during an active mode thereby reducing the need to replace the wireless mouse battery 160. Additionally, while the wireless mouse 152 is in an active mode or state and not in standby mode, the ultracapacitor 162 is being charged via movement of the wireless mouse 152 into which a inertial solenoidal energy harvester device 172 has been placed.

In an embodiment, the inertial solenoidal energy harvester device 174 may include a solenoid device that converts movement of a magnet 178 (e.g., permanent magnet) through a wire coil 180 into an electrical charge having a current and voltage. In an embodiment, the magnet 178 and wire coil 180 of the inertial solenoidal energy harvester device 172 is placed within a housing of the wireless mouse 152 where movement of the wireless mouse 152 can be used to pass the magnet 178 through the wire coil 180. In an embodiment, a first end of the magnet 178, while passed into the wire coil 180 is operatively coupled to a first counterweight 182. Additionally, a second end of the magnet 178 may be operatively coupled to a second counterweight 184. This causes the magnet 178 to remain within the wire coil 180 but allows the magnet 178 to move or slide through the wire coil 180 when the wireless mouse 152 is moved back and forth. Via the movement of the wireless mouse 152, and as the magnet 178 is moved through the wire coil 180, a current and voltage is created. This current and voltage is passed to, in an example embodiment, an ultracapacitor 162 formed on a charging circuit board 186. In an embodiment, the ends of the wire coil 180 may be electrically coupled to the ultracapacitor 162 via the charging circuit board 186 such that this current and voltage may be used to charge the ultracapacitor 162 of the wireless mouse 152 when the wireless mouse 152 is actively used and not in a standby mode. Thus, during use of the wireless mouse 152, the user moves the wireless mouse 152 and the first counterweight 182 and second counterweight 184 cause the magnet 178 to pass through back and forth through the wire coil 180 of the inertial solenoidal energy harvester device 172 while holding the magnet 178 within wire coil 180, thereby creating this current and voltage.

In order to increase the speed at which the ultracapacitor 162 is charged, multiple inertial solenoidal energy harvester devices 174 may be placed within the housing of the wireless mouse 152. In this embodiment, each of the wire coils 180 of each of these plurality of inertial solenoidal energy harvester devices 172 is operatively coupled to the charging circuit board 186 housing the ultracapacitor 162 such that each of the inertial solenoidal energy harvester devices 172 can charge the ultracapacitor 162. In an embodiment, each of the inertial solenoidal energy harvester devices 172 may be arranged in a variety of positions including a position such that one inertial solenoidal energy harvester device 172 lies perpendicular or in a different orientation to the others such that movement of the wireless mouse 152 in any direction will create a current and voltage used to charge the ultracapacitor 162 in some embodiments.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
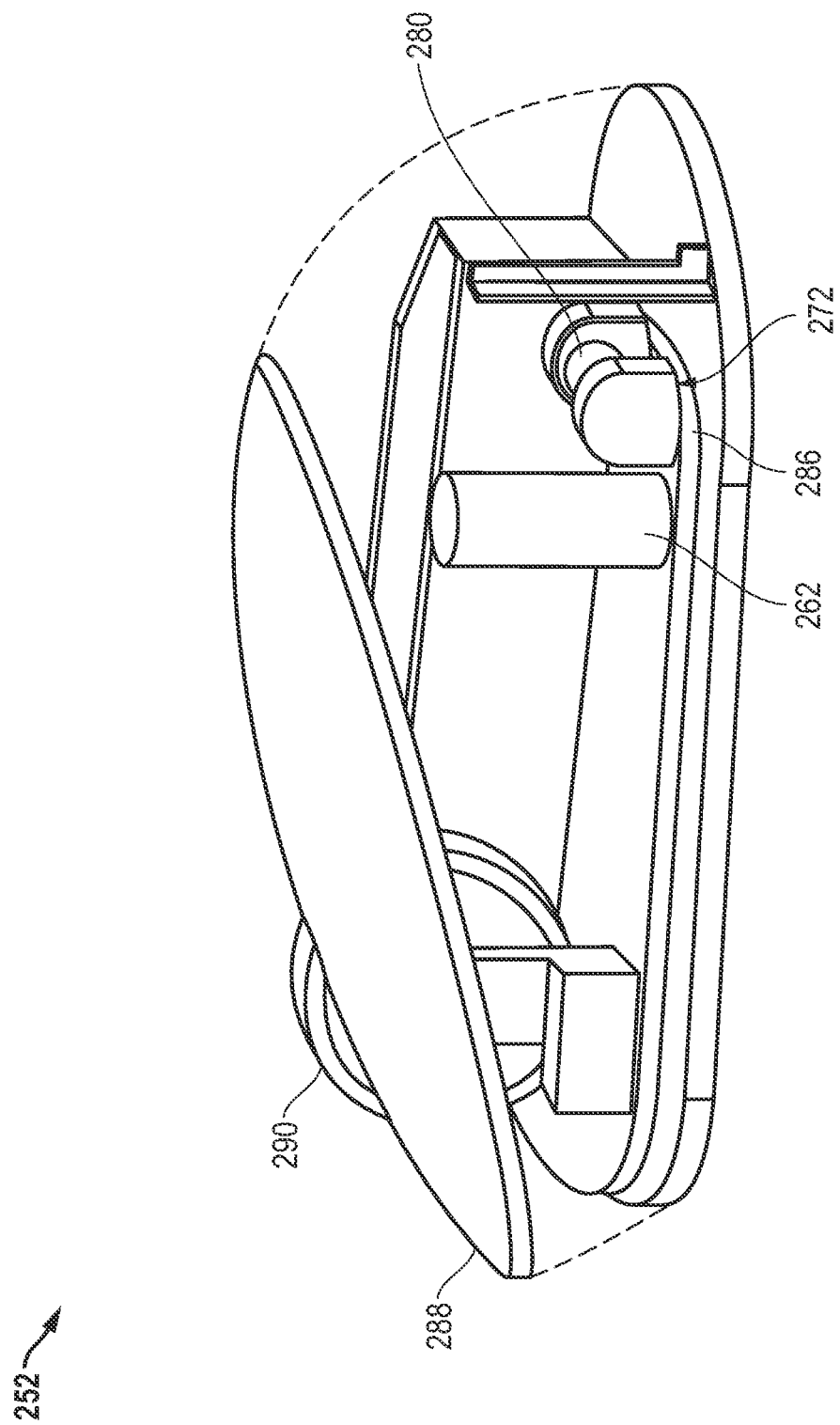
FIG. 2 is a side perspective view of a wireless mouse having an ultracapacitor and a inertial solenoidal energy harvester device formed into the wireless mouse according to an embodiment of the present disclosure.

FIG. 2 is a side perspective view of a wireless mouse 252 having an ultracapacitor 262 and a inertial solenoidal energy harvester device 272 formed into the wireless mouse 252 according to an embodiment of the present disclosure. As described herein, the wireless mouse 252 is wirelessly coupled to an information handling system (not shown) via wireless radio and antenna (not shown). This requires the wireless mouse 252 to be powered by its own power source that includes a battery (not shown) and an ultracapacitor 262.

During operation, a user may interface with the wireless mouse 252 by moving the wireless mouse 252, actuating a wireless mouse button 288, and/or moving a wireless mouse scroll wheel 290. Where the user moves the wireless mouse 252 this is detected by an optical light emitting diode (LED) sensor device, a roller ball, or other movement detector or sensor. This movement is provided as cursor movement data to the information handling system via the wireless mouse radio and wireless mouse antenna to serve as input to move a cursor across a video display device of the information handling system. Where the user presses the wireless mouse button 288, this may be provided to the information handling system and used as selection input to select objects presented to the user on the video display device. Where the user moves the wireless mouse scroll wheel 290, this may be provided to the information handling system and used as scrolling input to scroll a graphical user interface (GUI) presented to the user on the video display device.

As described herein, the wireless mouse microcontroller (not shown) may execute a mouse actuation/engagement agent that determines when a user has interacted with the wireless mouse 252 such as via any of the above inputs. This interaction may include, for example, pressing the wireless mouse button 288, rotating the wireless mouse scroll wheel 290, and moving the wireless mouse 252. As such the wireless mouse microcontroller may execute the actuation/engagement sensor to receive such inputs from any number of actuation/engagement sensors that detect this engagement as described. For example, when the user presses the wireless mouse button 288, the wireless mouse button 288 serves as an actuation/engagement sensor that, when actuated, is indicative of user interaction. In another example, where the user rotates the wireless mouse scroll wheel 290, the wireless mouse scroll wheel 290 also serves as an actuation/engagement sensor that, when rotated, is also indicative of user interaction with the wireless mouse 252. Where the user moves the wireless mouse 252, a roller ball, an optical LED movement sensor, or other wireless mouse 252 positioning detector, serving as an actuation/engagement sensor, may provide this input to the wireless mouse microcontroller that indicates a user interaction. In yet another example embodiment, the wireless mouse 252 may include a proximity sensor that, at least, detects a user's interaction with the housing of the wireless mouse 152 such as a motion detector that detects motion of the user near the wireless mouse 152 or a capacitive touch sensor detecting touch of a user on the housing of the wireless mouse 252. Any detected presence of a user by this proximity or touch sensor serving as the actuation/engagement sensor indicates user interaction or engagement with the wireless mouse 252. In an embodiment, this proximity or touch sensor may be placed within a palm rest formed on the wireless mouse 252 such that the proximity or touch sensor can detect a user's body or body part.

As described herein, the wireless mouse microcontroller also executes code instructions of a mouse actuation/engagement agent. The mouse actuation/engagement agent determines, with the actuation/engagement sensor, when a user interacts with the wireless mouse 252. Execution of code instructions of a mouse standby agent allows the wireless mouse microcontroller to determine whether the wireless mouse 252 is to be placed in a standby mode when no movement of the mouse by the user is detected, when no user presence is detected, or when no actuation of a button on the wireless mouse 252 has been detected over a time period. When placed in a standby mode, the wireless mouse 252 may switch power to the ultracapacitor 262 instead of the wireless mouse battery thereby conserving the power within the wireless mouse battery (not shown) during non-use of the wireless mouse 252 when in standby mode.

The wireless mouse 252 further includes a inertial solenoidal energy harvester device 272 operatively coupled to the ultracapacitor 262 such that actuation of the inertial solenoidal energy harvester device 272 creates an electrical charge used to charge the ultracapacitor 262. The wireless mouse microcontroller 256 and wireless mouse PMU (not shown) may coordinate the charging of the ultracapacitor 262 with the inertial solenoidal energy harvester device 272 as described in embodiments herein when the user is engaging with the wireless mouse 252. In an embodiment, the inertial solenoidal energy harvester device 274 may include a solenoid device that converts movement of a magnet (e.g., permanent magnet) (not shown) through a wire coil 280 into an electrical charge having a current and voltage. In an embodiment, the magnet and wire coil 280 of the inertial solenoidal energy harvester device 272 is placed within a housing of the wireless mouse 252 where movement of the wireless mouse 252 can be used to pass the magnet through the wire coil 280. In an embodiment, a first end of the magnet, while passed into the wire coil 280 is operatively coupled to a first counterweight (not shown). Additionally, a second end of the magnet may be operatively coupled to a second counterweight (not shown). This causes the magnet to remain within the wire coil 280, but allows the magnet to slide through the wire coil 280 when the wireless mouse 252 is moved. Via the movement of the wireless mouse 252 and as the magnet is moved through the wire coil 280, a current and voltage is created. This current and voltage is passed to, in an example embodiment, an ultracapacitor 262 formed on a charging circuit board 286. In an embodiment, the ends of the wire coil 280 may be electrically coupled to the ultracapacitor 262 and charging circuit board 286 such that this current and voltage may be used to charge the ultracapacitor 262 of the wireless mouse 252 when the wireless mouse 252 is not in a standby mode. Thus, during use of the wireless mouse 252, as the user moves the wireless mouse 252 the first counterweight and second counterweight cause the magnet to pass through the wire coil 280 of the inertial solenoidal energy harvester device 272 thereby creating this current and voltage.

Figure 3A:
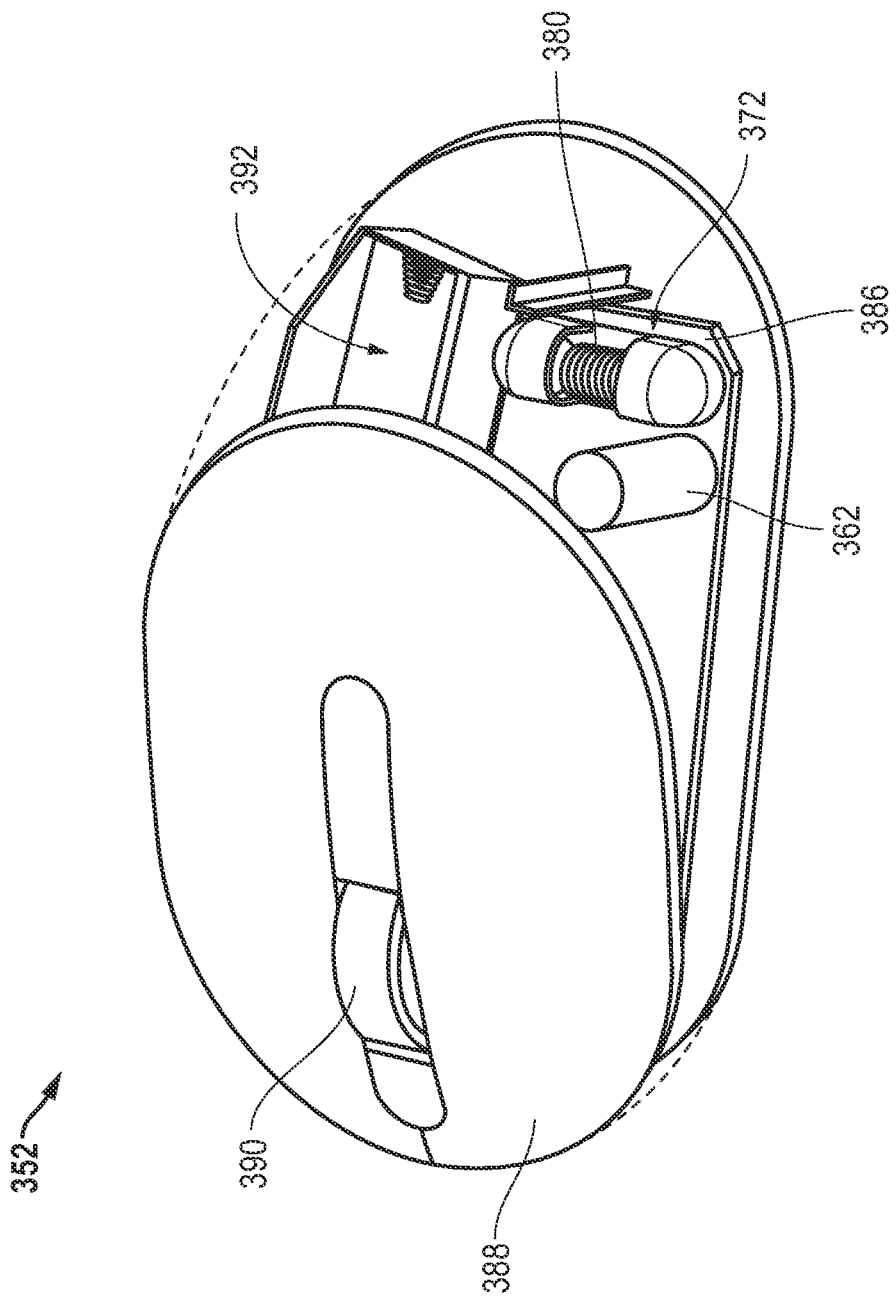
FIG. 3A is a top perspective view of a wireless mouse having an ultracapacitor and a inertial solenoidal energy harvester device formed into the wireless mouse according to another embodiment of the present disclosure.
Figure 3B:
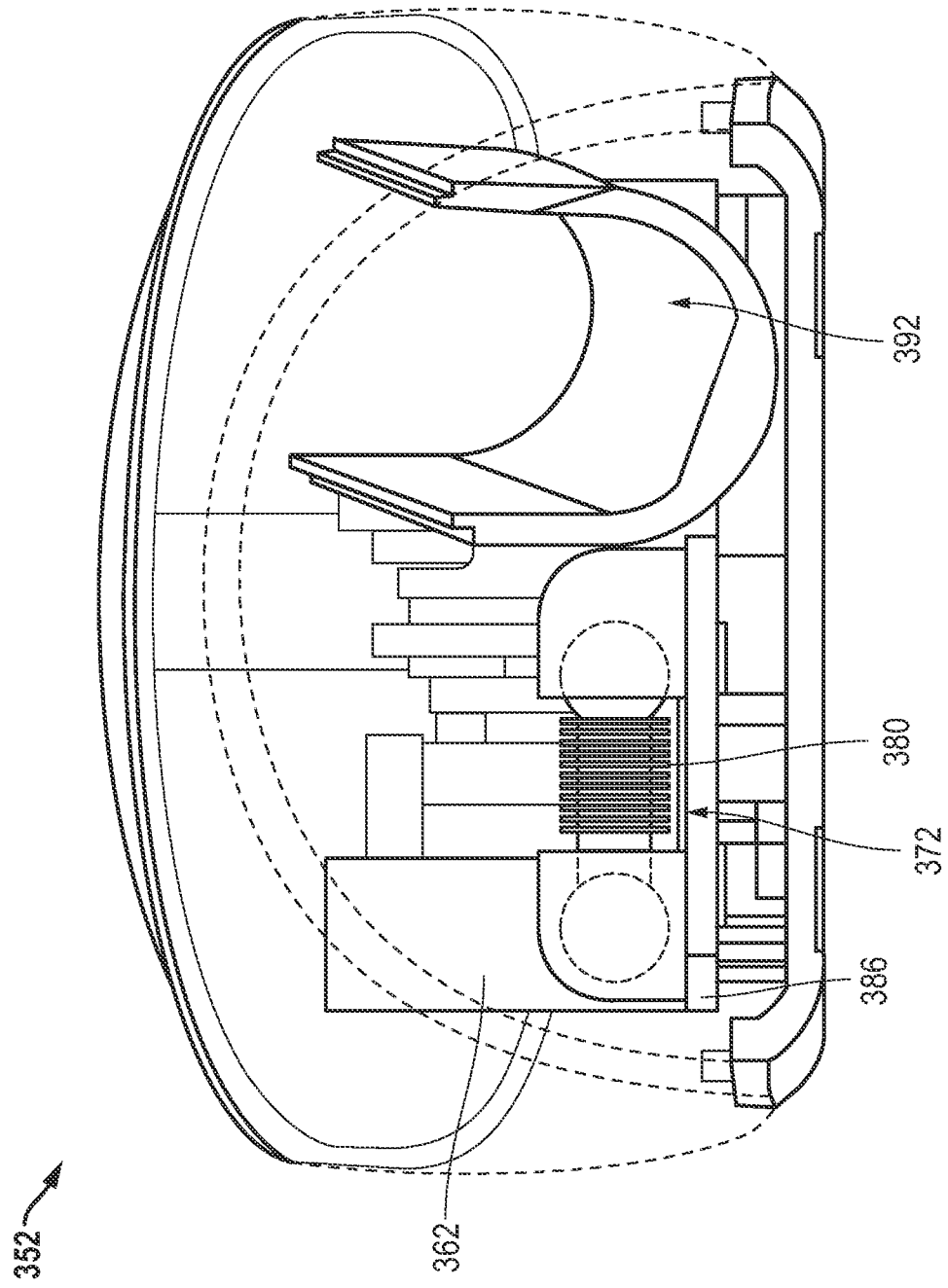
FIG. 3B is a back view of a wireless mouse having an ultracapacitor and a inertial solenoidal energy harvester device formed into the wireless mouse according to another embodiment of the present disclosure.

FIG. 3A is a top perspective view of a wireless mouse 352 having an ultracapacitor 362 and a inertial solenoidal energy harvester device 372 formed into the wireless mouse according to another embodiment of the present disclosure. Additionally, FIG. 3B is a back view of a wireless mouse 352 having an ultracapacitor 362 and a inertial solenoidal energy harvester device 372 formed into the wireless mouse 352 according to another embodiment of the present disclosure. FIGS. 3A and 3B show alternative views of the wireless mouse 352 with an example arrangement of the ultracapacitor 362, inertial solenoidal energy harvester device 372, and battery compartment 392 within the housing of the wireless mouse 352.

As shown in FIGS. 3A and 3B, for example, the wireless mouse 352 includes a battery compartment 392 formed within the housing of the wireless mouse 352. This battery compartment 392 may hold a battery used to power the wireless mouse 352 while the wireless mouse 352 is not in a standby mode as described herein. The wireless mouse PMU (not shown) may, under the direction of the wireless mouse microcontroller, may switch powering the wireless mouse 352 to the ultracapacitor 362 from a battery (not shown) housed in the battery compartment 392 when the wireless mouse 352 is in a standby mode. The wireless mouse PMU, under the direction of the wireless mouse microcontroller, may switch powering the wireless mouse 352 via the ultracapacitor 362 back to a battery housed in the battery compartment 392 when the wireless mouse microcontroller switches from a standby mode to a non-standby mode. The battery housed within the battery compartment 392 may be any type and size of battery including an alkaline battery, a lithium battery, and the like.

FIGS. 3A and 3B also shows the inertial solenoidal energy harvester device 372 operatively coupled to the ultracapacitor 362 such that actuation of the inertial solenoidal energy harvester device 372 creates an electrical charge used to charge the ultracapacitor 362. The wireless mouse microcontroller and wireless mouse PMU may coordinate the charging of the ultracapacitor 362 with the inertial solenoidal energy harvester device 372 as described herein when the user is engaging with the wireless mouse 352. In an embodiment, the inertial solenoidal energy harvester device 374 may include a solenoid device that converts movement of a magnet (e.g., permanent magnet) 378 in FIG. 3B through a wire coil 380 into an electrical charge having a current and voltage. In an embodiment, the magnet 378 and wire coil 380 of the inertial solenoidal energy harvester device 372 is placed within a housing of the wireless mouse 352 where movement of the wireless mouse 352 during cursor control can be used to slide the magnet 378 back and forth through the wire coil 380. In an embodiment, a first end of the magnet, while passed into the wire coil 380 is operatively coupled to a first counterweight 382. Additionally, a second end of the magnet may be operatively coupled to a second counterweight 384. This causes the magnet 378 to remain within the wire coil 380 but allows the magnet 378 to move through the wire coil 380 when the wireless mouse 352 is moved. Via the movement of the wireless mouse 352 and as the magnet 378 is moved through the wire coil 380, a current and voltage is created. This current and voltage is passed to, in an example embodiment, the ultracapacitor 362 formed on a charging circuit board 386. In an embodiment, the ends of the wire coil 380 may be electrically coupled to the ultracapacitor 362 and charging circuit board 386 such that this current and voltage may be used to charge the ultracapacitor 362 of the wireless mouse 352 when the wireless mouse 352 is not in a standby mode. Thus, during use of the wireless mouse 352, as the user moves the wireless mouse 352 the first counterweight 382 and second counterweight 384 cause the magnet 378 to pass through the wire coil 380 of the inertial solenoidal energy harvester device 372 thereby creating this current and voltage, but also hold the magnet 378 within the wire coil 380 due to counterweight encasements 396 and 397.

Figure 4:
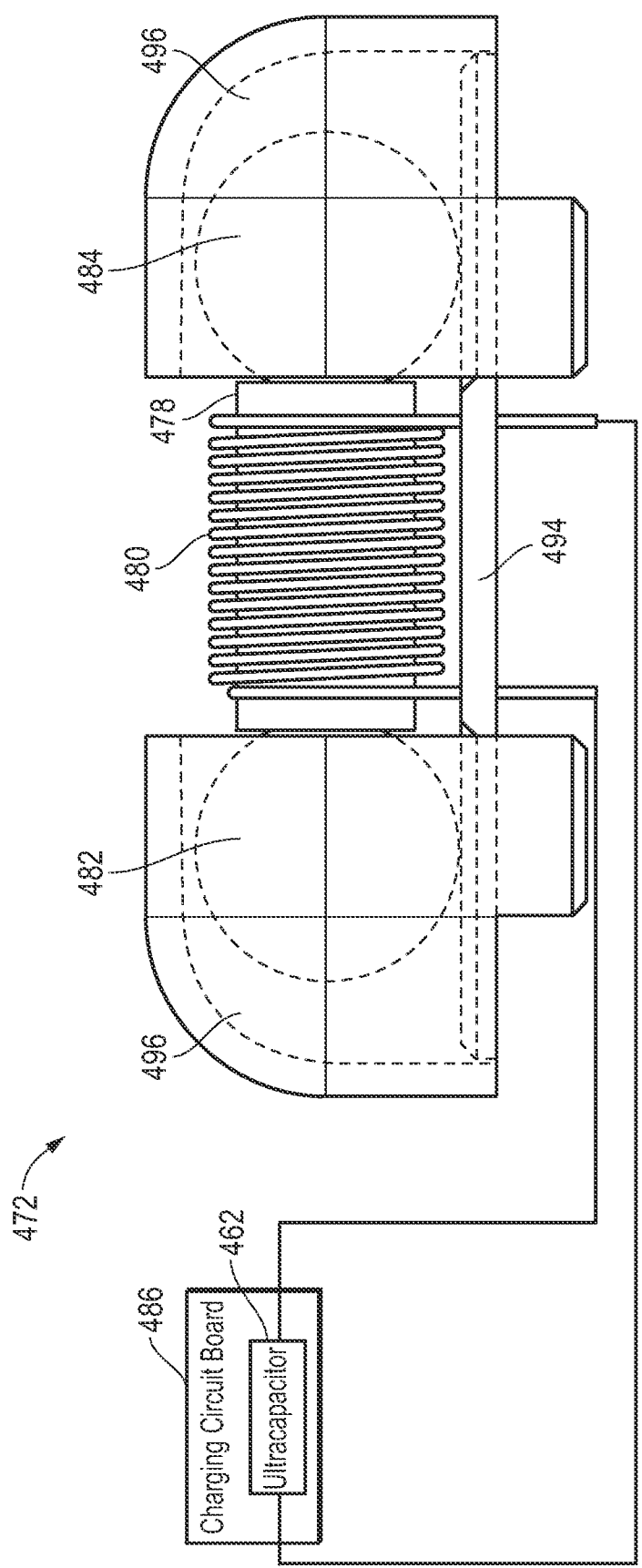
FIG. 4 is a side view of a inertial solenoidal energy harvester device for use within a housing of a wireless mouse according to an embodiment of the present disclosure.

FIG. 4 is a side view of a inertial solenoidal energy harvester device 472 formed within the housing of a wireless mouse according to an embodiment of the present disclosure. As described herein, the inertial solenoidal energy harvester device 472 may be placed within the housing of the wireless mouse so that movement of the wireless mouse moves the magnet 478 through the wire coil 480. The orientation of the inertial solenoidal energy harvester device 472 may, therefore, be selected such that side-to-side motion of the wireless mouse causes the magnet 478 to move within the wire coil 480. It is appreciated that multiple inertial solenoidal energy harvester devices 472 may be housed within the housing of the wireless mouse such that movement in any direction (e.g., side to side, front to back, up and down) can create the current and voltage to charge the ultracapacitor 462 at the charging circuit board 486.

In an embodiment, a first end of the magnet 478, while passed into the wire coil 480 is operatively coupled to a first counterweight 482. Additionally, a second end of the magnet 478 may be operatively coupled to a second counterweight 484. In an embodiment, the first counterweight 482 and the second counterweight 484 may be a metal ball bearing held to magnet 478 by magnetic force. Further, the circumference of the first counterweight 482 and second counterweight 484 may be larger than the diameter of the wire coil 480. This causes the magnet 478 to remain within the wire coil 480, but allows the magnet 478 to move through the wire coil 480 when the wireless mouse is moved. Via the movement of the wireless mouse and as the magnet 478 is moved through the wire coil 480, a current and voltage is created. This current and voltage is passed to, in an example embodiment, an ultracapacitor 462 formed on a charging circuit board 486. In an embodiment, the ends of the wire coil 480 may be electrically coupled to the ultracapacitor 462 and charging circuit board 486 such that this current and voltage may be used to charge the ultracapacitor 462 of the wireless mouse when the wireless mouse is not in a standby mode. Thus, during use of the wireless mouse, as the user moves the wireless mouse the first counterweight 482 and second counterweight 484 cause the magnet 478 to pass through the wire coil 480 of the inertial solenoidal energy harvester device 472 thereby creating this current and voltage.

In an embodiment, the inertial solenoidal energy harvester device 472 further includes a low friction plate 494. The low friction plate 494 allows for the first counterweight 482 and low friction plate 495 allows for the second counterweight 484 to move freely over the low friction plates 494 and 495 such that movement of the wireless mouse causes the movement of the first counterweight 482, second counterweight 484, and the magnet 478 as described herein. In an embodiment, the low friction plates 494 or 495 are made of polytetrafluoroethylene (PTFE), a polymide, Polyether ether ketone (PEEK), Polyphenylene sulfide (PPS), nylon, acetal, and polyester among other low friction plastic surfaces. In another embodiment, the low friction plates 494 or 495 may be made of a glass or metal that allows for similar or lower coefficients of friction to allow the first counterweight 482 and second counterweight 484 to move freely over the low friction plates 494 or 495.

Further, the inertial solenoidal energy harvester device 472 includes counterweight encasements 496 and 497 to contain the first counterweight 482 and the second counterweight 484 over low friction plates 494 and 495 in an embodiment. In some embodiments, the counterweight encasements 496 and 497 may be made of the same or a different material as the low friction plates 494 or 495.

FIGS. 5A and 5B are side views of a inertial solenoidal energy harvester 572 formed within a housing of a wireless mouse and operatively coupled to an ultracapacitor 562 on a charging circuit board 586 according to an embodiment of the present disclosure. FIG. 5A shows the movement of the first counterweight 582, magnet 578, and second counterweight 584 to a rightmost position according to the directional arrow. Additionally, FIG. 5B shows the movement of the first counterweight 582, magnet 578, and second counterweight 584 to a leftmost direction according to its directional arrow. Thus, FIG. 5A may represent how the magnet 578 is moved through the wire coil 580 as the user moves the wireless mouse in a first direction while FIG. 5B represents how the magnet 578 is moved through the wire coil 580 when the user moves the wireless mouse in a second direction.

Again, the inertial solenoidal energy harvester device 572 may be placed within the housing of the wireless so that movement of the wireless mouse moves the magnet 578 through the wire coil 580. The orientation of the inertial solenoidal energy harvester device 572 may, therefore, be selected such that side-to-side motion of the wireless mouse causes the magnet 578 to move within the wire coil 580. It is appreciated that multiple inertial solenoidal energy harvester devices 572 may be housed within the housing of the wireless mouse such that movement in any direction (e.g., side to side, front to back, up and down) can create the current and voltage to charge the ultracapacitor 562 at the charging circuit board 586.

In an embodiment, a first end of the magnet 578, while passed into the wire coil 580 is operatively coupled to a first counterweight 582. Additionally, a second end of the magnet 578 may be operatively coupled to a second counterweight 584. In an embodiment, the first counterweight 582 and the second counterweight 584 may be a metal ball bearing held to magnet 578 by magnetic force. Further, the circumference of the first counterweight 582 and second counterweight 584 may be larger than the diameter of the wire coil 580. This holds the magnet 578 to remain within the wire coil 580, but allows the magnet 578 to move through the wire coil 580 when the wireless mouse is moved. Via the movement of the wireless mouse and as the magnet 578 is moved through the wire coil 580, a current and voltage is created. This current and voltage is passed to, in an example embodiment, an ultracapacitor 562 formed on a charging circuit board 586. In an embodiment, the ends of the wire coil 580 may be electrically coupled to the ultracapacitor 562 and charging circuit board 586 such that this current and voltage may be used to charge the ultracapacitor 562 of the wireless mouse when the wireless mouse is not in a standby mode. Thus, during use of the wireless mouse, as the user moves the wireless mouse the first counterweight 582 and second counterweight 584 cause the magnet 578 to pass through the wire coil 580 of the inertial solenoidal energy harvester device 572 thereby creating this current and voltage.

In an embodiment, the inertial solenoidal energy harvester device 572 further includes a low friction plates 594 and 595. The low friction plates 594 and 595 allow for the first counterweight 582 and second counterweight 584 to move freely over the low friction plates 594 and 595 such that movement of the wireless mouse causes the movement of the first counterweight 582, second counterweight 584, and the magnet 578 as described herein. In an embodiment, the low friction plates 594 and 595 are made of polytetrafluoroethylene (PTFE), a polymide, Polyether ether ketone (PEEK), Polyphenylene sulfide (PPS), nylon, acetal, and polyester among other low friction plastic surfaces. In another embodiment, the low friction plates 594 and 595 may be made of a glass or metal that allows for similar or lower coefficients of friction to allow the first counterweight 582 and second counterweight 584 to move freely over the low friction plates 594 and 595. The inertial solenoidal energy harvester device 572 also includes counterweight encasements 596 and 597 to contain the first counterweight 582 and the second counterweight 584 over low friction plates 594 and 595 in an embodiment.

Figure 6:
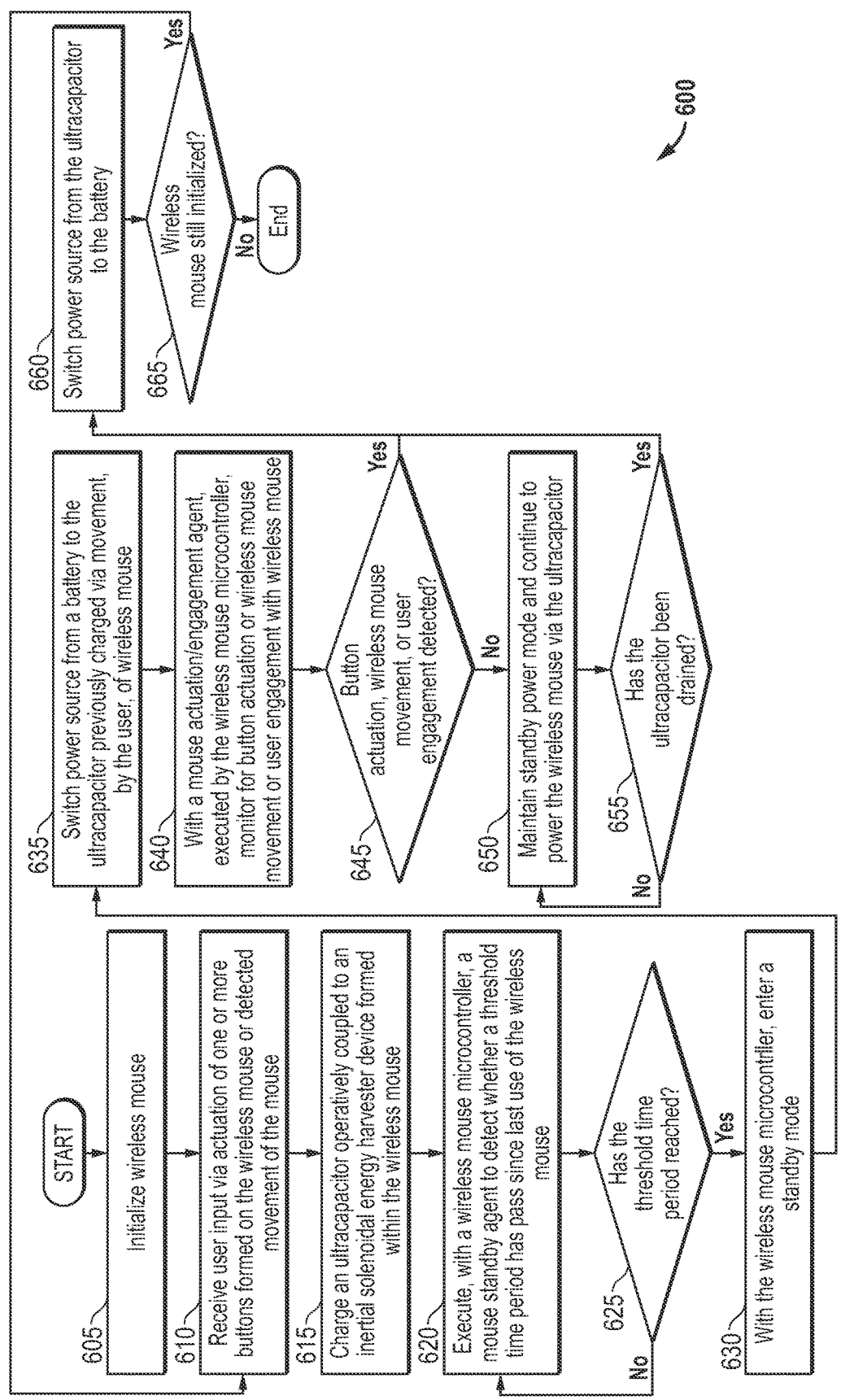
FIG. 6 is a flow diagram illustrating a method of operating a wireless keyboard operatively coupled to an information handling system according to an embodiment of the present disclosure.

FIG. 6 is a flow diagram illustrating a method 600 of operating a wireless mouse operatively coupled to an information handling system according to an embodiment of the present disclosure. As described herein, the wireless mouse includes at least one inertial solenoidal energy harvester device formed within a housing of the wireless mouse. As described herein, the wireless mouse may include a plurality of inertial solenoidal energy harvester devices. It is appreciated, therefore, that the ultracapacitor described herein may be charged by multiple inertial solenoidal energy harvester device placed at multiple locations or in multiple orientations within the wireless mouse.

The method 600 may include, at block 605, initializing the wireless mouse. As described herein, the initialization of the wireless mouse may include a user actuating a power button or switch to cause power to be provided to, at least, the wireless mouse microcontroller.

At block 610, the method 600 further includes receiving user input at the wireless mouse via actuation of one or more buttons formed on the wireless mouse, rotation of the wireless mouse scroll wheel, and/or movement of the wireless mouse. The wireless mouse may allow a user to provide input to an information handling system. Because the wireless mouse is wirelessly coupled to the information handling system, the wireless mouse includes a wireless mouse radio and wireless mouse antenna to transceive this input data to the information handling system.

The method 600 includes, at block 615, charging the ultracapacitor operatively coupled to the inertial solenoidal energy harvester device formed in the housing of the wireless mouse. As described herein, the inertial solenoidal energy harvester device includes a magnet that is passed into the wire coil and operatively coupled to a first counterweight. Additionally, a second end of the magnet may be operatively coupled to a second counterweight. This causes the magnet to remain within the wire coil, but allows the magnet to move through the wire coil when the wireless mouse is moved. Via the movement of the wireless mouse, such as during cursor control, the magnet is moved through the wire coil, a current and voltage is created. This current and voltage is passed to, in an example embodiment, an ultracapacitor formed on a charging circuit board. In an embodiment, the ends of the wire coil may be electrically coupled to the ultracapacitor and charging circuit board such that this current and voltage may be used to charge the ultracapacitor of the wireless mouse when the wireless mouse is not in a standby mode. Thus, during use of the wireless mouse, as the user moves the wireless mouse the first counterweight and second counterweight cause the magnet to pass through the wire coil of the inertial solenoidal energy harvester device thereby creating this current and voltage.

At block 620, the method 600 includes executing, with a wireless mouse microcontroller, a mouse standby agent to detect whether a threshold time period has passed since the wireless mouse was last used and/or the user had been detected at the wireless mouse. As described herein, the execution of the mouse standby agent may include the initiation of a countdown clock that determines whether this threshold time period has passed. Concurrently, the wireless mouse microcontroller executes a mouse actuation/engagement agent such that the wireless mouse microcontroller is notified if and when a user has moved the wireless mouse, actuated a key on the wireless mouse, or has detected, via another actuation/engagement sensor, the user touching or is at the wireless mouse according to embodiments herein. Where the execution of the mouse actuation/engagement agent by the wireless mouse microcontroller detects actuation of the wireless mouse movement sensor, actuation of a mouse key, or presence of the user, this countdown clock is reset, and the mouse standby agent waits for the countdown to be met.

At block 625, therefore, the wireless mouse microcontroller determines whether the threshold time period has been reached by the countdown being met. Where the threshold time period has not been reached due to the execution of the mouse actuation/engagement agent indicating user actuation of the wireless mouse by movement of the mouse, actuation of a mouse button, actuation of the wireless mouse scroll wheel, and/or presence of a user, the method 600 returns to block 620 to continue monitoring a countdown or for user actuation or presence as described in embodiments herein. However, where the user has walked away from the wireless mouse thereby allowing the threshold time limit to expire at block 625, the method 600 continues to block 630.

At block 630, the wireless mouse microcontroller causes the wireless mouse to enter into a standby mode that reduces the power consumption of the wireless mouse. However, the wireless mouse radio and even the microcontroller may continue to operate to scan or monitor for wireless communications from the information handling system or to be ready to detect movement of the wireless mouse, an actuation of the wireless mouse button, actuation of the wireless mouse scroll wheel, and/or user presence. Thus, power is still consumed, but at a lower level. In prior art systems, this may drain the batteries, such as dry cell batteries.

At block 635, the wireless mouse microcontroller may switch power sources from the wireless mouse battery to the ultracapacitor. Because the ultracapacitor was previously charged via movement of the wireless mouse and operation of the inertial solenoidal energy harvester device, the ultracapacitor has sufficient power to power the wireless mouse for a time while in standby mode. However, depending on the length of time that the wireless mouse is in standby mode, the ultracapacitor may not be capable of powering the wireless mouse and eventually, the wireless mouse microcontroller may switch back to operating the wireless mouse off of the power of the wireless mouse battery when power has been drained in the ultracapacitor as described herein. Nonetheless, this will prolong the life of the wireless mouse battery, especially dry cell batteries.

At block 640, the wireless mouse microcontroller, via execution of the mouse actuation/engagement agent, may monitor for user actuation of the wireless mouse by movement, actuation of a mouse key and/or other user engagement with the wireless mouse. As described herein, the execution of the mouse actuation/engagement agent looks for one or more of a plurality of triggering events that will bring the wireless mouse out of the standby mode. A first triggering event may include detected movement of the wireless mouse from an optical LED movement sensor, ball roller sensor, or other movement sensor that detects bumps or movement of the wireless mouse. A second triggering event includes an actuation of any mouse button which may be a button switch that is mechanical, capacitive, electrical, resistive, magnetic, or other known in the art. In an embodiment, when input from any mouse button is received at the wireless mouse microcontroller, the wireless mouse microcontroller wakes up and executes the actuation/engagement sensor as described herein. A third triggering event could include, in some embodiments, an actuation of a wireless mouse scroll wheel. In an embodiment, when input from the wireless mouse scroll wheel is received at the wireless mouse microcontroller, the wireless mouse microcontroller wakes up and executes the actuation/engagement sensor as described herein. A fourth triggering event could include signals received from an actuation/engagement sensor. In an embodiment, the actuation/engagement sensor is an IR camera or sensor that detects the presence of the user in front of the wireless mouse. In another embodiment, the actuation/engagement sensor is a capacitive touch sensor to sense a user's touch or a motion sensor that detects a user near the wireless mouse. It is appreciated that the wireless mouse microcontroller, executing the mouse actuation/engagement agent, may receive input from any of these sensors in order to trigger the wireless mouse microcontroller to wake up.

At block 645, therefore, the wireless mouse microcontroller determines whether the mouse movement sensor detects motion, a mouse button actuation, wireless mouse scroll wheel rotation, or user presence has been detected. Where mouse movement, wireless mouse scroll wheel rotation, mouse button actuation, or user presence has been detected, the method moves to block 660 to enter an active mode. Where mouse movement, wireless mouse scroll wheel rotation, mouse button actuation, or user presence has not been detected, the method moves to block 650 with the wireless mouse microcontroller being maintained in the standby mode and the ultracapacitor continuing to provide power to the wireless mouse. However, as described herein, the ultracapacitor itself may run out of power prior to the user reengaging with the wireless mouse. As such, at block 655, the wireless mouse microcontroller determines, via the wireless mouse PMU, whether the available power in the ultracapacitor has been drained or not. If the power in the ultracapacitor has not been drained, the method 600 proceeds to block 650 to continue to power the wireless mouse from the ultracapacitor as described in embodiments herein. If power in the ultracapacitor has been drained, the flow proceeds to block 660.

Where the power has been drained from the ultracapacitor as determined at block 655 or where the mouse button actuation, wireless mouse scroll wheel rotation, or user engagement at the wireless mouse is detected at block 645, the method 600 proceeds to block 660. At block 660 the wireless mouse microcontroller, with the wireless mouse PMU, switches the power source from the ultracapacitor to the wireless mouse battery. Again, as described herein, by including the ultracapacitor and the inertial solenoidal energy harvester device within the wireless mouse, power is conserved at the wireless mouse battery thereby reducing the frequency at which the user has to replace the wireless mouse battery. This not only reduces the costs associated with operating the wireless mouse but also reduces the number of batteries that need to be disposed of or recycled thereby reducing the environmental impact due to the operation of the wireless mouse.

At block 665, the method 600 includes determining whether the wireless mouse is still initiated. Where the wireless mouse is still initiated, the method 600 proceeds to block 610 to perform the methods described herein. Where the wireless mouse is no longer initiated, the method 600 may end.

The blocks of the flow diagrams of FIG. 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless mouse operatively coupled to an information handling system comprising:
   a wireless mouse microcontroller;
   a wireless mouse power management unit (PMU) including the wireless mouse microcontroller to manage providing power to the wireless mouse microcontroller and the wireless mouse PMU operatively coupled to a battery and an ultracapacitor to provide power via the wireless mouse PMU;
   a inertial solenoidal energy harvester device operatively coupled to the wireless mouse PMU and the ultracapacitor and placed within a housing of the wireless mouse to charge the ultracapacitor when the wireless mouse is moved;
   the inertial solenoidal energy harvester device comprising a wire coil with a magnet placed within the wire coil, a first counterweight placed at a first end of the magnet, and a second counterweight placed at a second end of the magnet, where the magnet slides through the coil wire to generate charge to charge the ultracapacitor;
   the wireless mouse PMU to power the wireless mouse with the ultracapacitor when the mouse is in a standby mode; and
   the wireless mouse microcontroller executing code instructions of a mouse actuation/engagement agent to determine when the wireless mouse has been engaged with by a user based on input from an actuation/engagement sensor and, with the wireless mouse PMU, switch to power the wireless mouse with the battery when the wireless mouse exits the standby mode.

2. The wireless mouse of claim 1 further comprising:
   the wireless mouse microcontroller executing code instructions of a mouse standby agent to determine when a threshold time period has expired since a user has last interacted with the mouse based on wireless mouse engagement data received from the actuation/engagement sensor and to place the wireless mouse in a standby mode; and
   the wireless mouse PMU to power the wireless mouse using the ultracapacitor.

3. The wireless mouse of claim 1, wherein the first counterweight and second counterweight are of a larger diameter than the wire coil to prevent the removal of the magnet from within the wire coil as the magnet slides within the wire coil.

4. The wireless mouse of claim 1, wherein the magnet is longer than the wire coil and the first counterweight and second counterweight are metal ball bearings magnetically coupled to the magnet to provide momentum for the magnet to slide back and forth within the wire coil.

5. The wireless mouse of claim 1, further comprising:
   the inertial solenoidal energy harvester device having counterweight encasements to encase the first counterweight and the second counterweight to maintain the first counterweight and the second counterweight sliding within the inertial solenoidal energy harvester device.

6. The wireless mouse of claim 1 further comprising:
   the wireless mouse microcontroller to, via the mouse PMU, detect when the ultracapacitor has been drained of power and switch to the battery as a power source during the standby mode.

7. The wireless mouse of claim 1 further comprising:
   a low friction plate formed of a material having a low coefficient of friction for reduction of friction between the low friction plate and the first and second counterweight, where at least one low friction plate is installed under the location of the first counterweight and the second counterweight in the wireless mouse to allow the first counterweight and the second counterweight to slide on top of the low friction plate during movement of the magnet within the wire coil when the wireless mouse is moved.

8. A method of operating a wireless mouse operatively coupled to an information handling system comprising:
with a inertial solenoidal energy harvester device operatively coupled to a wireless mouse PMU including a wireless mouse microcontroller and placed within a housing of the wireless mouse, charging an ultracapacitor operatively coupled to the wireless mouse PMU and the inertial solenoidal energy harvester device when a user moves the wireless mouse to move a magnet through a wire coil within the inertial solenoidal energy harvester device;
detecting, with the wireless mouse microcontroller, when a threshold period of time has expired since a user has last engaged with the wireless mouse based on the mouse engagement data received from the wireless mouse microcontroller and placing the wireless mouse in a standby mode and switching, with the wireless mouse PMU including the wireless mouse microcontroller, to power the wireless mouse with the ultracapacitor in the standby mode, and
detecting, with the wireless mouse microcontroller, when the wireless mouse is engaged by the user with based on input from an actuation/engagement sensor and switching with the wireless mouse microcontroller at the wireless mouse PMU a power source from the ultracapacitor to a battery.

9. The method of claim 8 further comprising:
the inertial solenoidal energy harvester device comprising the wire coil with the magnet having a longer dimension than the wire coil when the magnet is placed horizontally within the wire coil, a first counterweight placed at a first end of the magnet, and a second counterweight placed at a second end of the magnet and the first counterweight, the magnet, and the second counter weight to cause the magnet to slide through the wire coil horizontally relative to the bottom of the wireless mouse when the user moves the wireless mouse on a horizontal surface.

10. The method of claim 9, wherein the first counterweight and second counterweight are of a wider dimension than the wire coil to prevent the removal of the magnet from within the wire coil as the magnet moves within the wire coil.

11. The method of claim 9, wherein the first counterweight is located to rest on and slide freely on a low friction plate formed of a material having a low coefficient of friction for reduction of friction between the low friction plate and the first counterweight to facilitate sliding of the magnet back and forth in the wire coil when the wireless mouse is moved.

12. The method of claim 8 further comprising:
a first counterweight that is a metal ball bearing placed at a first end of the magnet, and a second counterweight placed at a second end of the magnet, where the first counterweight is magnetically coupled to the magnet.

13. The method of claim 8, further comprising:
detecting, with the wireless mouse microcontroller and the wireless mouse PMU, when the ultracapacitor has been drained of power and switch to the battery as a power source during the standby mode.

14. The method of claim 8 further comprising:
wherein passing of the magnet through the wire coil of the inertial solenoidal energy harvester device causes a charge to be provided at the ultracapacitor to charge the ultracapacitor via a charging circuit when not being used to power the wireless mouse.

15. A wireless mouse comprising:
a wireless mouse microcontroller;
a wireless mouse radio to wirelessly communicate with a host information handling system;
a power management unit (PMU) including the wireless mouse microcontroller to manage providing power to the wireless mouse microcontroller and the wireless mouse radio, the PMU operatively coupled to a battery and an ultracapacitor to provide power;
a inertial solenoidal energy harvester device operatively coupled to the ultracapacitor and placed within a housing of the wireless mouse to charge the ultracapacitor when the wireless mouse is moved by the user to move the inertial solenoidal energy harvester device;
the wireless mouse microcontroller to determine when a threshold time period has expired since a user has last engaged with the wireless mouse based on mouse engagement data received from an actuation/engagement sensor and the wireless mouse microcontroller of the PMU to place the wireless mouse in a standby mode and to switch power to the ultracapacitor; and
the wireless mouse microcontroller of the PMU to detect when the user engages with the wireless mouse based on input from the actuation/engagement sensor and to switch a power source from the ultracapacitor to the battery.

16. The wireless mouse of claim 15 further comprising:
a touch sensor as the actuation/engagement sensor formed on a housing of the wireless mouse operatively coupled to the mouse actuation/engagement agent to detect the presence of the user of the wireless mouse to determine mouse engagement data.

17. The wireless mouse of claim 15 further comprising:
the inertial solenoidal energy harvester device including a magnet slidably inserted within a wire coil, wherein passing of the magnet through the wire coil causes a charge to be provided to the ultracapacitor via a charging circuit to charge the ultracapacitor with movement of the wireless mouse.

18. The wireless mouse of claim 15 further comprising:
the wireless mouse microcontroller to, via the mouse PMU, detect when the ultracapacitor has been drained of power and switch to the battery as a power source during the standby mode.

19. The wireless mouse of claim 15 further comprising:
a low friction plate formed of a material having a low coefficient of friction for reduction of friction between the low friction plate and a first counterweight formed resting on the low friction plate and operably coupled to a magnet slidably inserted in a wire coil of the inertial solenoidal energy harvester device;
a second counterweight operably coupled to the magnet;
the first counterweight and the second counterweight causing the magnet to slide within the wire coil when the wireless mouse is moved to generate a charge.

20. The wireless mouse of claim 15, wherein the inertial solenoidal energy harvester is oriented within the wireless mouse such that movement of the wireless mouse horizontally across a surface when placed on a horizontal surface causes charge to be generated to charge the ultracapacitor.

* * * * *